(12) United States Patent
Chen et al.

(10) Patent No.: US 9,183,877 B1
(45) Date of Patent: Nov. 10, 2015

(54) DATA STORAGE DEVICE COMPRISING TWO-DIMENSIONAL DATA DEPENDENT NOISE WHITENING FILTERS FOR TWO-DIMENSIONAL RECORDING

(71) Applicant: Western Digital Technologies, Inc., Irvine, CA (US)

(72) Inventors: Yiming Chen, Irvine, CA (US); Ning Zheng, Troy, NY (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/664,570

(22) Filed: Mar. 20, 2015

(51) Int. Cl.
*G11B 5/035* (2006.01)
*G11B 20/10* (2006.01)

(52) U.S. Cl.
CPC .... *G11B 20/10481* (2013.01); *G11B 20/10046* (2013.01)

(58) Field of Classification Search
None
See application file for complete search history.

(56) References Cited

U.S. PATENT DOCUMENTS

| | | | |
|---|---|---|---|
| 5,151,891 A | 9/1992 | Bergmans | |
| 5,229,901 A | 7/1993 | Mallary | |
| 5,321,559 A | 6/1994 | Nguyen et al. | |
| 5,347,509 A | 9/1994 | Goldberg et al. | |
| 5,588,011 A | 12/1996 | Riggle | |
| 5,606,464 A | 2/1997 | Agazzi et al. | |
| 5,719,572 A | 2/1998 | Gong | |
| 5,801,652 A | 9/1998 | Gong | |
| 5,822,143 A | 10/1998 | Cloke et al. | |
| 5,825,832 A | 10/1998 | Benedetto | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,104,766 A | 8/2000 | Coker et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,154,335 A | 11/2000 | Smith et al. | |
| 6,157,510 A | 12/2000 | Schreck et al. | |
| 6,175,893 B1 | 1/2001 | D'Souza et al. | |
| 6,178,056 B1 | 1/2001 | Cloke et al. | |
| 6,185,175 B1 * | 2/2001 | Zook | 369/53.35 |
| 6,191,909 B1 | 2/2001 | Cloke et al. | |
| 6,195,218 B1 | 2/2001 | Guttmann et al. | |
| 6,205,494 B1 | 3/2001 | Williams | |

(Continued)

OTHER PUBLICATIONS

Patrick J. Lee, et. al., U.S. Appl. No. 13/789,071, filed Mar. 7, 2013, 15 pages.

(Continued)

*Primary Examiner* — Tan X Dinh

(57) ABSTRACT

A data storage device is disclosed wherein a first 2D data dependent noise whitening (DDNW) filter is configured to perform 2D DDNW of first and second 2D equalized samples to generate first 2D noise whitened samples. A second 2D DDNW filter is configured to perform 2D DDNW of the first and second 2D equalized samples to generate second 2D noise whitened samples. A 2D sequence detector is configured to detect a first data sequence recorded in a first data track from the first and second 2D noise whitened samples and to detect a second data sequence recorded in a second data track from the first and second 2D noise whitened samples.

26 Claims, 3 Drawing Sheets

(56) References Cited

U.S. PATENT DOCUMENTS

| | | |
|---|---|---|
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,047 B1 | 10/2002 | Kleinerman et al. |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,532,272 B1 | 3/2003 | Ryan et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,094 B2 | 7/2003 | Rae et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,625,235 B1 | 9/2003 | Coker et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,741,645 B2 | 5/2004 | Tan et al. |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,140 B2 | 11/2004 | Brommer et al. |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,326 B1 | 3/2005 | Eran et al. |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,931,585 B1 | 8/2005 | Burd et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |

(56) References Cited

U.S. PATENT DOCUMENTS

| | | |
|---|---|---|
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,549 B2 | 9/2006 | Asakura |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,158,324 B2 | 1/2007 | Stein et al. |
| 7,165,211 B2 | 1/2007 | Stein et al. |
| 7,171,108 B1 | 1/2007 | Masters et al. |
| 7,171,110 B1 | 1/2007 | Wilshire |
| 7,173,783 B1 | 2/2007 | McEwen et al. |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,212,593 B2 | 5/2007 | He |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,259,927 B2 | 8/2007 | Harris |
| 7,263,652 B2 | 8/2007 | Zaboronski et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,286,595 B2 | 10/2007 | Cideciyan et al. |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,360,147 B2 | 4/2008 | Vasiliev |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,424,074 B2 | 9/2008 | Lee et al. |
| 7,424,077 B2 | 9/2008 | Yang et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,471,746 B2 | 12/2008 | Radich |
| 7,486,060 B1 | 2/2009 | Bennett |
| 7,496,493 B1 | 2/2009 | Stevens |
| 7,518,819 B1 | 4/2009 | Yu et al. |
| 7,522,367 B2 | 4/2009 | Eleftheriou et al. |
| 7,525,746 B1 | 4/2009 | Oberg |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,561,640 B2 | 7/2009 | Kaynak et al. |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,599,450 B2 | 10/2009 | Yang et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,729,071 B2 | 6/2010 | Harada |
| 7,730,295 B1 | 6/2010 | Lee |
| 7,738,201 B1 | 6/2010 | Jin et al. |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,948,703 B1 * | 5/2011 | Yang .................. 360/68 |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |

(56) References Cited

U.S. PATENT DOCUMENTS

| | | |
|---|---|---|
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,259,872 B2 | 9/2012 | Wu et al. |
| 8,271,692 B1 | 9/2012 | Dinh et al. |
| 8,271,863 B2 | 9/2012 | Yang et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,296,638 B2 | 10/2012 | Derras |
| 8,300,339 B1 | 10/2012 | Nangare et al. |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,750 B1 | 5/2013 | Nangare et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,537,482 B1 | 9/2013 | Song et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,508 B1 | 12/2013 | Burd |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,661 B2 | 4/2014 | Ng et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,717,697 B1 | 5/2014 | Kondo et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,791 B1 | 7/2014 | Lu et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |

(56) References Cited

U.S. PATENT DOCUMENTS

| | | |
|---|---|---|
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 8,896,949 B1 * | 11/2014 | Lee et al. ............ 360/39 |
| 8,947,812 B1 | 2/2015 | Wang |
| 9,013,821 B1 | 4/2015 | Chen |
| 2004/0037202 A1 | 2/2004 | Brommer et al. |
| 2004/0169946 A1 | 9/2004 | Uno et al. |
| 2004/0196897 A1 | 10/2004 | Tan et al. |
| 2005/0213458 A1 | 9/2005 | Iwase |
| 2005/0226316 A1 | 10/2005 | Higashino et al. |
| 2006/0015798 A1 | 1/2006 | Coene et al. |
| 2007/0047121 A1 * | 3/2007 | Eleftheriou et al. ............ 360/51 |
| 2007/0076826 A1 | 4/2007 | Stockmanns et al. |
| 2007/0085709 A1 | 4/2007 | Coene et al. |
| 2007/0115574 A1 * | 5/2007 | Eleftheriou et al. ............ 360/39 |
| 2007/0201585 A1 | 8/2007 | Feng |
| 2008/0192378 A1 * | 8/2008 | Bliss et al. ............ 360/69 |
| 2009/0113702 A1 | 5/2009 | Hogg |
| 2009/0195909 A1 * | 8/2009 | Eleftheriou et al. ............ 360/75 |
| 2010/0067621 A1 | 3/2010 | Noeldner et al. |
| 2010/0067628 A1 | 3/2010 | Buehner et al. |
| 2010/0085849 A1 | 4/2010 | Yin et al. |
| 2010/0306551 A1 | 12/2010 | Meyer et al. |
| 2011/0226729 A1 | 9/2011 | Hogg |
| 2011/0242692 A1 | 10/2011 | Blinick et al. |
| 2011/0246864 A1 | 10/2011 | Eleftheriou et al. |
| 2012/0063022 A1 | 3/2012 | Mathew et al. |
| 2012/0089657 A1 | 4/2012 | Yang et al. |
| 2012/0105994 A1 | 5/2012 | Bellorado et al. |
| 2012/0120784 A1 * | 5/2012 | Yang et al. ............ 369/107 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0027801 A1 | 1/2013 | Kumar et al. |
| 2013/0182347 A1 | 7/2013 | Maeto |
| 2013/0215528 A1 | 8/2013 | Okubo et al. |
| 2013/0223199 A1 | 8/2013 | Lund et al. |
| 2014/0185421 A1 | 7/2014 | Nakamura et al. |

OTHER PUBLICATIONS

Alvin J. Wang, et al., U.S. Appl. No. 14/089,912, filed Nov. 26, 2013, 19 pages.

Alvin J. Wang, et al., U.S. Appl. No. 14/178,155, filed Feb. 11, 2014, 25 pages.

Yiming Chen, et al., U.S. Appl. No. 13/968,323, filed Aug. 15, 2013, 19 pages.

S. Nabavi, B. V. K. V. Kumar, "Two-Dimensional Generalized Partial Response Equalizer for Bit-Patterned Media," IEEE Trans. Magn., vol. 44, No. 11, pp. 6249-6254, Nov. 2008.

K.S. Chan, R. Radhakrishnan , K. Eason , R. M. Elidrissi, J. Miles , B. Vasic and A. R. Krishnan, "Channel Models and Detectors for Two-Dimensional Magnetic Recording (TDMR)," IEEE Trans. Magn., vol. 46, No. 3, Mar. 2010.

Yunxiang Wu, Joseph A. O'Sullivan, Naveen Singla, and Ronald S. Indeck, "Iterative Detection and Decoding for Separable Two-Dimensional Intersymbol Interference," IEEE Transactions on Magnetics, vol. 39, No. 4, Jul. 2003, pp. 2115-2120.

T. Losuwan, C. Warisarn, P. Supnithi, and P. Kovintavewat, "A Study of 2D detection for Two-Dimensional Magnetic Recording," in Proc. of ITC-CSCC 2012, Jul. 15-18, 2012, Sapporo, Japan.

Yao Wang, M. F. Erden, R. H. Victora, "Novel System Design for Readback at 10 Terabits per Square Inch User Areal Density," IEEE Magnetics Letters, vol. 3, Dec. 2012.

* cited by examiner

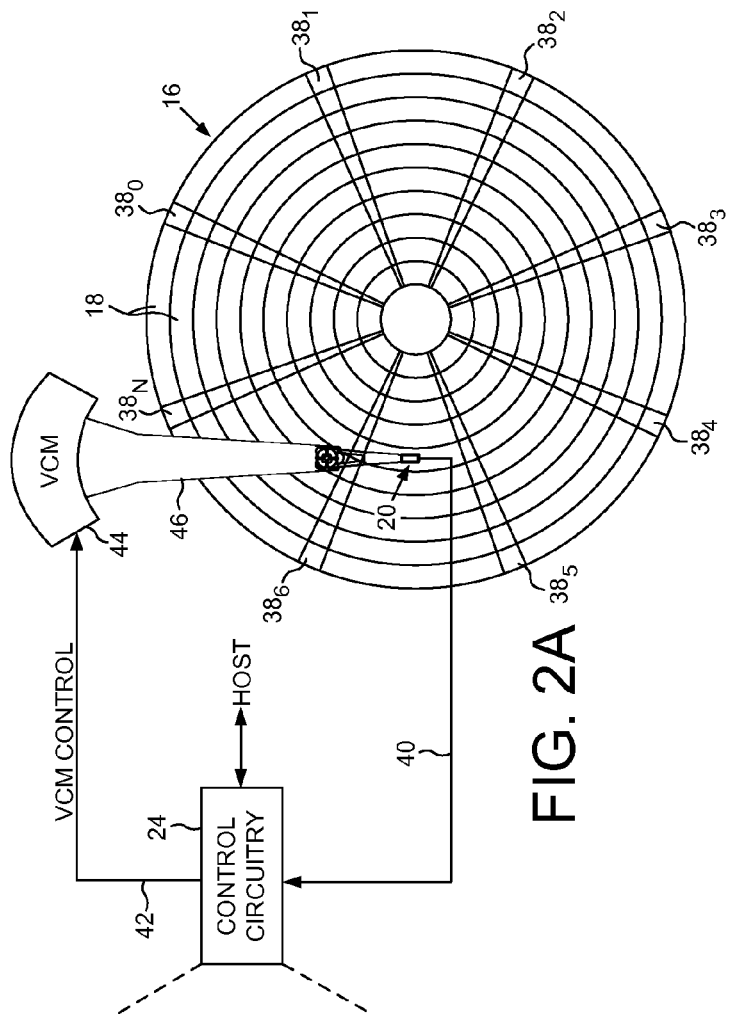
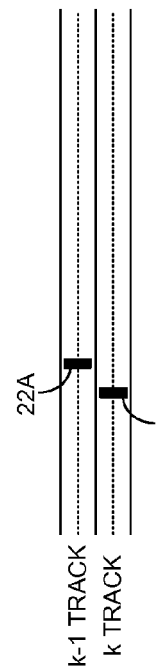
FIG. 2A
FIG. 2B
FIG. 2C

DATA STORAGE DEVICE COMPRISING TWO-DIMENSIONAL DATA DEPENDENT NOISE WHITENING FILTERS FOR TWO-DIMENSIONAL RECORDING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

Data is typically written to data sectors within a data track by modulating the write current of a write element, for example, using a non-return to zero (NRZ) encoding where a binary "1" is written using positive write current (+1) and a binary "0" is written using a negative write current (−1), thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

A common demodulation technique employed in disk drives is known as partial response maximum likelihood (PRML), wherein the recording channel is equalized into a desired partial response (e.g., PR4, EPR4, etc.), the resulting read signal sampled, and the signal samples demodulated using a ML data detector. The ML data detector is commonly implemented using the well known Viterbi data detector which attempts to find the minimum distance sequence (in Euclidean space) through a trellis. The accuracy of a Viterbi data detector matches a true ML data detector only if the signal noise is time invariant (data independent) and white (statistically independent) with a Gaussian probability distribution.

In the magnetic recording channel of a disk drive, the signal noise is neither data independent nor white, and therefore signal processing techniques have been employed to improve the accuracy of the ML data detector by compensating for the data dependent, non-white noise in the read signal. For example, the prior art has employed a bank of data dependent noise whitening filters in front of the ML detector that each attempt to whiten the signal noise based on an optimal noise-whitening function for each possible recorded data sequence. The output of each data dependent noise whitening filter is then used to compute the corresponding branch metrics in the ML detector (e.g., for each branch corresponding to the data sequence assigned to each data dependent noise whitening filter). Since the noise correlating effect of the recording channel (including the equalizer filter) is essentially infinite, the performance of each data dependent noise whitening filter increases as the length of the corresponding data sequence increases. However, the number of data dependent noise whitening filters also doubles with each additional bit in the data sequence (e.g., there are $2^N$ data dependent noise whitening filters where N is the length of the data sequence).

BRIEF DESCRIPTION OF THE DRAWINGS

FIG. 2A shows a data storage device in the form of a disk drive according to an embodiment comprising a head actuated over a disk comprising a plurality of data tracks.

FIG. 2B shows an embodiment wherein the head comprises a first read element positioned over a first data track, and a second read element positioned over a second data track.

FIG. 2C is a flow diagram according to an embodiment wherein two-dimensional (2D) data dependent noise whitening (DDNW) filtering is employed to detect data sequences recorded in the first and second tracks.

DETAILED DESCRIPTION

Figure 1:
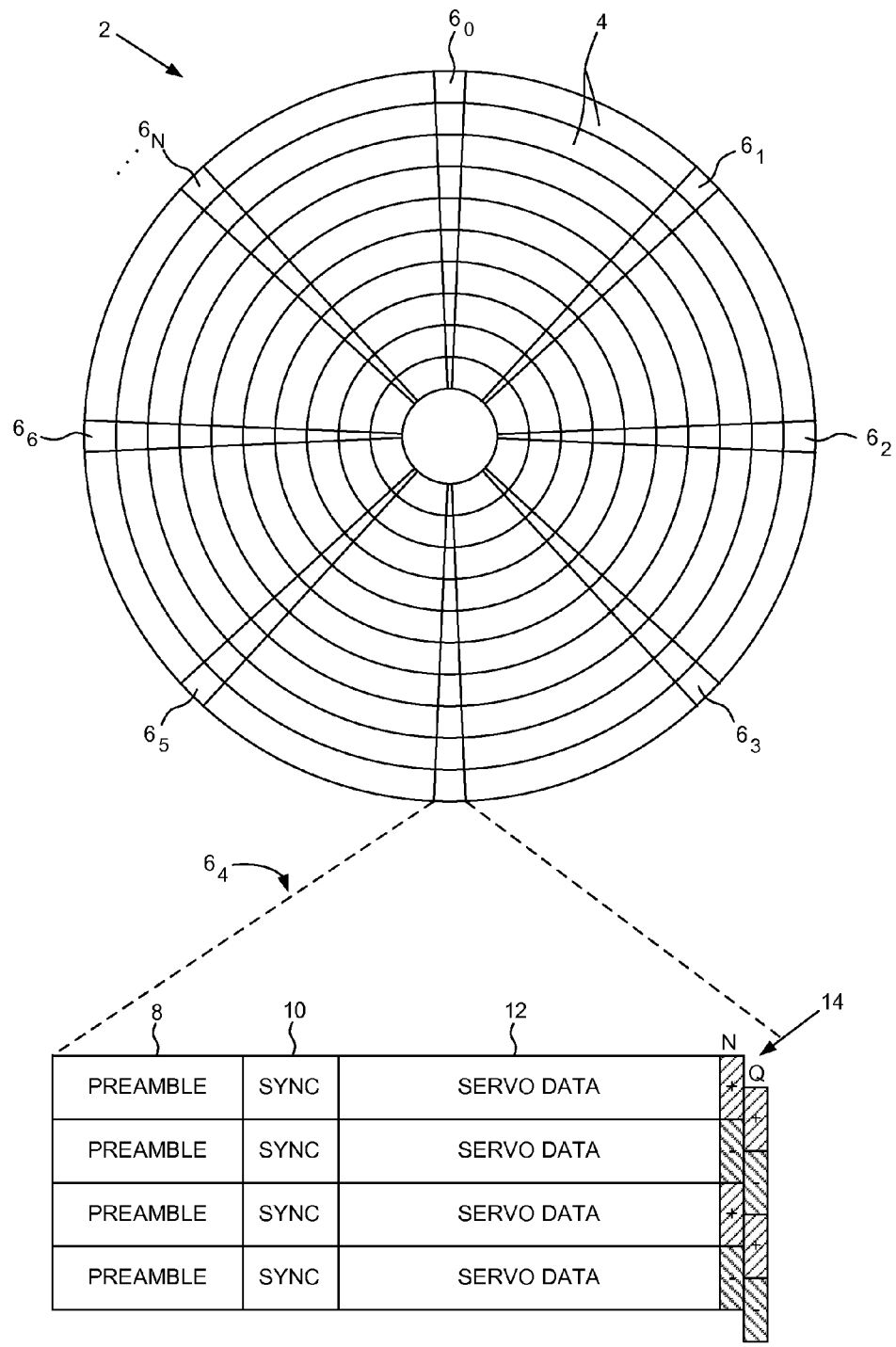
FIG. 1 shows a prior art disk format comprising a plurality of servo tracks defined by servo sectors.

FIG. 2A shows a data storage device comprising a disk 16 comprising a plurality of data tracks 18, and a head 20 actuated over the disk 16, wherein the head 20 comprises a first read element 22A and a second read element 22B (FIG. 2B). The disk drive further comprises control circuitry 24 configured to execute the flow diagram of FIG. 2C, wherein the first read element 22A is positioned over a first data track k−1 and the second read element 22B is positioned over a second data track k as shown in FIG. 2B. A first read signal from the first read element is sampled to generate first signal samples, and a second read signal from the second read element is sampled to generate second signal samples (block 26). First two-dimensional (2D) equalization is performed on the first signal samples and the second signal samples to generate first 2D equalized samples (block 28), and a second 2D equalization is performed on the first signal samples and the second signal samples to generate second 2D equalized samples (block 30). First 2D data dependent noise whitening (DDNW) filtering is performed on the first and second 2D equalized samples to generate first 2D noise whitened samples (block 32), and second 2D DDNW filtering is performed on the first and second 2D equalized samples to generate second 2D noise whitened samples (block 34). A first data sequence recorded in the first data track is detected from the first and second 2D noise whitened samples and a second data sequence recorded in the second data track is detected from the first and second 2D noise whitened samples (block 36).

In the embodiment of FIG. 2A, the disk 16 comprises a plurality of servo sectors $38_0$-$38_N$ that define a plurality of servo tracks, wherein the data tracks 18 are defined relative to the servo tracks at the same or different radial density. The control circuitry 24 processes a read signal 40 emanating from the head 20 to demodulate the servo sectors $38_0$-$38_N$ and generate a position error signal (PES) representing an error between the actual position of the head and a target position relative to a target track. The control circuitry 24 filters the PES using a suitable compensation filter to generate a control signal 42 applied to a voice coil motor (VCM) 44 which rotates an actuator arm 46 about a pivot in order to actuate the head 20 radially over the disk 16 in a direction that reduces the PES. The servo sectors $38_0$-$38_N$ may comprise any suitable head position information, such as a track address for coarse positioning and servo bursts for fine positioning. The servo bursts may comprise any suitable pattern, such as an amplitude based servo pattern or a phase based servo pattern.

Figure 3:
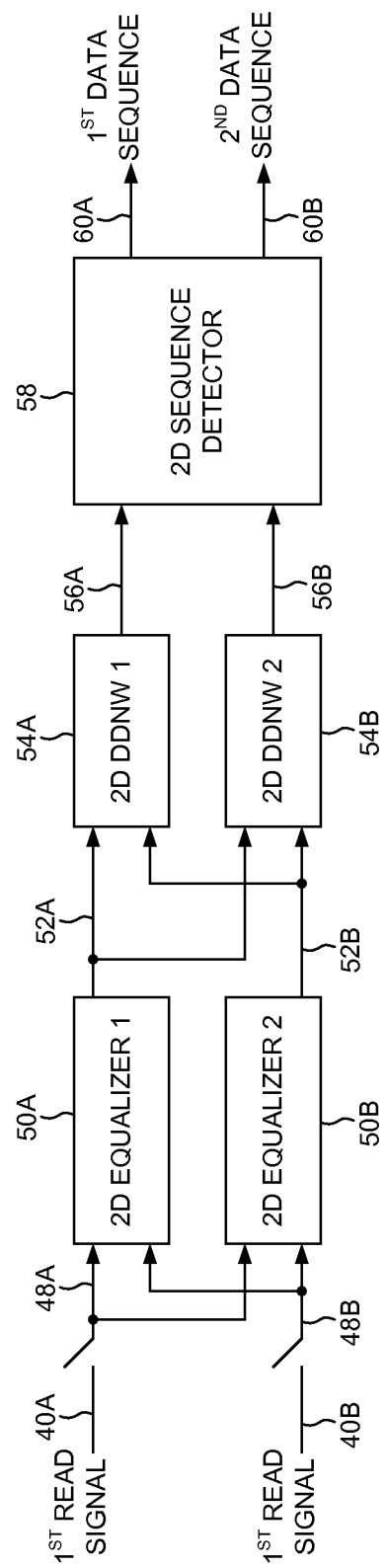
FIG. 3 shows control circuitry according to an embodiment comprising 2D equalizers, 2D DDNW filters, and a 2D sequence detector.

FIG. 3 shows control circuitry according to an embodiment wherein a first read signal 40A emanating from the first read element 22A (FIG. 2B) is sampled to generate first signal samples 48A, and a second read signal 40B emanating from the second read element 22B is sampled to generate second signal samples 48B. A first 2D equalizer 50A performs 2D equalization on the first and second signal samples 48A and 48B to generate first 2D equalized samples 52A, and a second 2D equalizer 50B performs 2D equalization on the first and second signal samples 48A and 48B to generate second 2D equalized samples 52B. In one embodiment, the first 2D equalizer 50A performs 2D equalization based on a target response of the data recorded in the first data track k−1 (FIG. 2B), and the second 2D equalizer 50B performs 2D equalization based on a target response of the data recorded in the second data track k. That is, the first 2D equalized samples 52A are samples that correspond to data recorded in the first data track k−1 including the effect of intersymbol interference (ISI) from the first data track k−1 as well as ISI from data recorded in the second data track k. Similarly, the second 2D equalized samples 52B are samples that correspond to data recorded in the second data track k including the effect of ISI from the second data track k as well as ISI from data recorded in the first data track k−1.

A first 2D DDNW filter 54A performs data dependent noise whitening on the first and second 2D equalized samples 52A and 52B to generate first 2D noise whitened samples 56A, and a second 2D DDNW filter 54B performs data dependent noise whitening on the first and second 2D equalized samples 52A and 52B to generate second 2D noise whitened samples 56B. A 2D sequence detector 58 is configured to detect a first data sequence 60A recorded in the first data track from the first and second 2D noise whitened samples 56A and 56B and to detect a second data sequence 60B recorded in the second data track from the first and second 2D noise whitened samples 56A and 56B.

Any suitable 2D equalizer may be employed in FIG. 3 as well as any suitable 2D sequence detector 58, such as a suitable 2D Viterbi detector. The details of the 2D equalization and sequence detection algorithms are omitted from this disclosure for clarity. The following is a detailed derivation for embodiments of the 2D DDNW filters 54A and 54B of FIG. 3, as well as an embodiment for computing the branch metrics of the sequence detector 58 based on the predicted error sequences.

In one embodiment, the first 2D DDNW filter 54A is configured to minimize a first data dependent noise prediction error $e_{k-1,t}(b)$ based on:

$$e_{k-1,t}(b) = n_{k-1,t}(b) - A_1^T(b)n(b) - m_1(b)$$

and the second 2D DDNW filter 54B is configured to minimize a second data dependent noise prediction error $e_{k,t}(b)$ based on:

$$e_{k,t}(b) = n_{k,t}(b) - A_2^T(b)n(b) - m_2(b)$$

where t represents a time index, b represents one of a plurality of data patterns, n(b) represents a 2D vector of past noise samples in the first and second 2D equalized samples 52A and 52B, $n_{k-1,t}(b)$ represents a noise sample in the first equalized samples 52A, $A_1(b)$ represents a first data dependent noise prediction filter, $m_1(b)$ represents a DC component of predicted noise in the first 2D equalized samples 52A, $n_{k,t}(b)$ represents a noise sample in the second 2D equalized samples 52B, $A_2(b)$ represents a second data dependent noise prediction filter, and $m_2(b)$ represents a DC component of predicted noise in the second 2D equalized samples 52B.

In one embodiment, a goal may be to minimize the variance of the prediction errors by minimizing the expectation of the squared prediction errors $e_{k-1,t}(b)$ and $e_{k,t}(b)$:

$$E(e_{k-1,t}^2(b)) = E(n_{k-1,t}^2(b)) + A_1^T(b)R(b)A_1(b) + m_1^2(b) - 2E(n_{k-1,t}(b)n^T(b))A_1^T(b) - 2m_1(b)E(n_{k-1,t}(b)) + 2A_1^T(b)m_1(b)E(n(b))$$

$$E(e_{k,t}^2(b)) = E(n_{k,t}^2(b)) + A_2^T(b)R(b)A_2(b) + m_2^2(b) - 2E(n_{k,t}(b)n^T(b))A_2^T(b) - 2m_2(b)E(n_{k,t}(b)) + 2A_2^T(b)m_2(b)E(n(b))$$

where $R(b) = E(n(b)n^T(b))$. By taking the derivative of the above squared prediction error $e_{k-1,t}(b)$ with respect to $A_1(b)$ and $m_1(b)$ and setting the result equal to zero gives:

$$R(b)A_1(b) - E(n(b)n_{k-1,t}(b)) + m_1(b)E(n(b)) = 0$$

$$m_1(b) - E(n_{k-1,t}(b)) + A_1^T(b)E(n(b)) = 0$$

The solutions to the above equations give the optimal values for $A_1(b)$ and $m_1(b)$:

$$m_1(b) = [E(n_{k-1,t}(b)) - E^T(n_{k-1,t}(b)n(b))R^{-1}(b)E(n(b))][1 - E^T(n(b))R^{-1}(b)E(n(b))]^{-1}$$

$$A_1(b) = R^{-1}(b)[E(n_{k-1,t}(b)n(b)) - m_1(b)E(n(b))]$$

where the corresponding error variance is $$\sigma_1^2(b) = E(n_{k-1,t}^2(b)) - E^T(n_{k-1,t}(b)n(b))R^{-1}(b)E(n_{k-1,t}(b)n(b)) - \frac{[E(n_{k-1,t}(b)) - E^T(n_{k-1,t}(b)n(b))R^{-1}(b)E(n(b))]^2}{1 - E^T(n(b))R^{-1}(b)E(n(b))}$$

By taking the derivative of the above squared prediction error $e_{k,t}(b)$ with respect to $A_2(b)$ and $m_2(b)$ and setting the result equal to zero provides the following solutions for $A_2(b)$ and $m_2(b)$ $$m_2(b) = [E(n_{k,t}(b)) - E^T(n_{k,t}(b)n(b))R^{-1}(b)E(n(b))][1 - E^T(n(b))R^{-1}(b)E(n(b))]^{-1}$$

$$A_2(b) = R^{-1}(b)[E(n_{k,t}(b)n(b)) - m_2(b)E(n(b))]$$

where the corresponding error variance is $$\sigma_1^2(b) = E(n_{k-1,t}^2(b)) - E^T(n_{k-1,t}(b)n(b))R^{-1}(b)E(n_{k-1,t}(b)n(b)) - \frac{[E(n_{k-1,t}(b)) - E^T(n_{k-1,t}(b)n(b))R^{-1}(b)E(n(b))]^2}{1 - E^T(n(b))R^{-1}(b)E(n(b))}$$

In one embodiment, with the above defined DDNW filter banks and the corresponding DC components, the two predicted errors at the same time index $e_{k-1,t}(b)$ and $e_{k,t}(b)$ may still be correlated with each other. Accordingly, in one embodiment it may be necessary to consider their covariance matrix when computing the branch metric in the 2D sequence detector 58, where the covariance matrix may be of the form:

$$\Sigma(b) = \begin{bmatrix} \sigma_1^2(b) & E(e_{k-1,t}(b)e_{k,t}(b)) \\ E(e_{k,t}(b)e_{k-1,t}(b)) & \sigma_2^2(b) \end{bmatrix}$$

In one embodiment, the branch metric br of the 2D sequence detector 58 may therefore be generated based on:

$$br = -\ln(|\Sigma(b)|) - e_t^T \Sigma^{-1}(b) \mathbf{i} \, e_t$$

where $e_t = [e_{k-1,t}(b), e_{k,t}(b)]^T$.

In an alternative embodiment, the first 2D DDNW filter 54A may be configured to minimize a first data dependent noise prediction error $e_{k-1,t}(b)$ based on:

$$e_{k-1,t}(b) = n_{k-1,t}(b) - \overline{A}_1^T(b)\overline{n}(b) - m_1(b)$$

and the second 2D DDNW filter 54B may be configured to minimize a second data dependent noise prediction error $e_{k,t}(b)$ based on:

$$e_{k,t}(b) = n_{k,t}(b) - \overline{A}_2^T(b)\overline{n}(b) - m_2(b)$$

where:
$\overline{n}(b) = [n(b), 1]$;
$\overline{A}_1(b) = [A_1(b), m_1(b)]$; and
$\overline{A}_2(b) = [A_2(b), m_2(b)]$.

In this embodiment, the DC component of the predicted noise may be considered as a coefficient of the DDNW filters and the predicted error variances may be expressed as:

$$E(e_{k-1,t}^2(b)) = E(n_{k-1,t}^2(b)) - 2E(n_{k-1,t}(b)\overline{n}^T(b))\overline{A}_1(b) + \overline{A}_1^T(b)\overline{R}(b)\overline{A}_1(b)$$

$$E(e_{k,t}^2(b)) = E(n_{k,t}^2(b)) - 2E(n_{k,t}(b)\overline{n}^T(b))\overline{A}_2(b) + \overline{A}_2^T(b)\overline{R}(b)\overline{A}_2(b)$$

where $\overline{R}(b) = E(\overline{n}(b)\overline{n}^T(b))$. By taking the derivative of the first equation with respect to $\overline{A}_1(b)$ and setting the result equal to zero gives:

$$\overline{A}_1(b) = \overline{R}^{-1}(b) E(n_{k-1}(b)\overline{n}(b))$$

with a corresponding predicted error variance:

$$\sigma_1^2(b) = E(n_{k-1,t}^2(b)) - E^T(n_{k-1,t}(b)\overline{n}(b)) \overline{R}^{-1}(b) E(n_{k-1,t}(b)\overline{n}(b))$$

By taking the derivative of the second equation with respect to $\overline{A}_2(b)$ and setting the result equal to zero gives:

$$\overline{A}_2(b) = \overline{R}^{-1}(b) E(n_k(b)\overline{n}(b))$$

with a corresponding predicted error variance:

$$\sigma_2^2(b) = E(n_{k,t}^2(b)) - E^T(n_{k,t}(b)\overline{n}(b)) \overline{R}^{-1}(b) E(n_{k,t}(b)\overline{n}(b))$$

In this embodiment, the branch metric br of the 2D sequence detector 58 may be generated in the same manner as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of data tracks;
   a head actuated over the disk, wherein the head comprises a first read element and a second read element; and
   control circuitry operable to:
   position the first read element over a first data track k−1 and position the second read element over a second data track k;
   sample a first read signal from the first read element to generate first signal samples;
   sample a second read signal from the second read element to generate second signal samples;

a first two-dimensional (2D) equalizer configured to perform 2D equalization of the first signal samples and the second signal samples to generate first 2D equalized samples;

a second 2D equalizer configured to perform 2D equalization of the first signal samples and the second signal samples to generate second 2D equalized samples;

a first 2D data dependent noise whitening (DDNW) filter configured to perform 2D DDNW of the first and second 2D equalized samples to generate first 2D noise whitened samples;

a second 2D DDNW filter configured to perform 2D DDNW of the first and second 2D equalized samples to generate second 2D noise whitened samples; and a 2D sequence detector configured to detect a first data sequence recorded in the first data track from the first and second 2D noise whitened samples and to detect a second data sequence recorded in the second data track from the first and second 2D noise whitened samples.

2. The data storage device as recited in claim 1, wherein:
the first 2D DDNW filter is configured to minimize a first data dependent noise prediction error $e_{k-1,t}(b)$ based on:

$$e_{k-1,t}(b) = n_{k-1,t}(b) - A_1^T(b)n(b) - m_1(b)$$

the second 2D DDNW filter is configured to minimize a second data dependent noise prediction error $e_{k,t}(b)$ based on:

$$e_{k,t}(b) = n_{k,t}(b) - A_2^T(b)n(b) - m_2(b)$$

where:
t represents a time index;
b represents one of a plurality of data patterns;
n(b) represents a 2D vector of past noise samples in the first and second 2D equalized samples;
$n_{k-1,t}(b)$ represents a noise sample in the first 2D equalized samples;
$A_1(b)$ represents a first data dependent noise prediction filter;
$m_1(b)$ represents a DC component of predicted noise in the first 2D equalized samples;
$n_{k,t}(b)$ represents a noise sample in the second 2D equalized samples;
$A_2(b)$ represents a second data dependent noise prediction filter; and
$m_2(b)$ represents a DC component of predicted noise in the second 2D equalized samples.

3. The data storage device as recited in claim 2, where:

$$m_1(b) = [E(n_{k-1,t}(b)) - E^T(n_{k-1,t}(b)n(b))R^{-1}(b)E(n(b))]$$
$$[1 - E^T(n(b))R^{-1}(b)E(n(b))]^{-1}$$

$$A_1(b) = R^{-1}(b)[E(n_{k-1,t}(b)n(b)) - m_1(b)E(n(b))]$$

$$R(b) = E(n(b)n^T(b)).$$

4. The data storage device as recited in claim 3, where:

$$m_2(b) = [E(n_{k,t}(b)) - E^T(n_{k,t}(b)n(b))R^{-1}(b)E(n(b))][1 - E^T(n(b))R^{-1}(b)E(n(b))]^{-1}$$

$$A_2(b) = R^{-1}(b)[E(n_{k,t}(b)n(b)) - m_2(b)E(n(b))]$$

$$R(b) = E(n(b)n^T(b)).$$

5. The data storage device as recited in claim 4, where:

$$\sigma_1^2(b) = E(n_{k-1,t}^2(b)) - E^T(n_{k-1,t}(b)n(b))R^{-1}(b)E(n_{k-1,t}(b)n(b)) -$$

$$\frac{[E(n_{k-1,t}(b)) - E^T(n_{k-1,t}(b)n(b))R^{-1}(b)E(n(b))]^2}{1 - E^T(n(b))R^{-1}(b)E(n(b))}$$

$$\sigma_2^2(b) = E(n_{k,t}^2(b)) - E^T(n_{k,t}(b)n(b))R^{-1}(b)E(n_{k,t}(b)n(b)) -$$

$$\frac{[E(n_{k,t}(b)) - E^T(n_{k,t}(b)n(b))R^{-1}(b)E(n(b))]^2}{1 - E^T(n(b))R^{-1}(b)E(n(b))}.$$

6. The data storage device as recited in claim 5, where the control circuitry is further configured to compute a covariance matrix of the form:

$$\Sigma(b) = \begin{bmatrix} \sigma_1^2(b) & E(e_{k-1,t}(b)e_{k,t}(b)) \\ E(e_{k,t}(b)e_{k-1,t}(b)) & \sigma_2^2(b) \end{bmatrix}.$$

7. The data storage device as recited in claim 5, where the control circuitry is further configured to generate a branch metric br of the 2D sequence detector according to:

$$br = -\ln(|\Sigma(b)|) - e_t^T \Sigma^{-1}(b) e_t$$

where $e_t = [e_{k-1,t}(b), e_{k,t}(b)]^T$.

8. The data storage device as recited in claim 1, wherein:
the first 2D DDNW filter is configured to minimize a first data dependent noise prediction error $e_{k-1,t}(b)$ based on:

$$e_{k-1,t}(b) = n_{k-1,t}(b) - \overline{A}_1^T(b)\overline{n}(b) - m_1(b)$$

the second 2D DDNW filter is configured to minimize a second data dependent noise prediction error $e_{k,t}(b)$ based on:

$$e_{k,t}(b) = n_{k,t}(b) - \overline{A}_2^T(b)\overline{n}(b) - m_2(b)$$

where:
t represents a time index;
b represents one of a plurality of data patterns;
$\overline{n}(b) = [n(b), 1]$
n(b) represents a 2D vector of past noise samples in the first and second 2D equalized samples;
$n_{k-1,t}(b)$ represents a noise sample in the first 2D equalized samples;
$\overline{A}_1(b) = [A_1(b), m_1(b)]$;
$A_1(b)$ represents a first data dependent noise prediction filter;
$m_1(b)$ represents a DC component of predicted noise in the first 2D equalized samples;
$n_{k,t}(b)$ represents a noise sample in the second 2D equalized samples; and
$\overline{A}_2(b) = [A_2(b), m_2(b)]$;
$A_2(b)$ represents a second data dependent noise prediction filter; and
$m_2(b)$ represents a DC component of predicted noise in the second 2D equalized samples.

9. The data storage device as recited in claim 8, where:

$$\overline{A}_1(b) = \overline{R}^{-1}(b)E(n_{k-1}(b)\overline{n}(b))R(b) = E(n(b)n^T(b));$$

and $$\overline{R}(b) = E(\overline{n}(b)\overline{n}^T(b)).$$

10. The data storage device as recited in claim 9, where:

$$\overline{A}_2(b) = \overline{R}^{-1}(b)E(n_k(b)\overline{n}(b));$$

and $$\overline{R}(b) = E(\overline{n}(b)\overline{n}^T(b)).$$

11. The data storage device as recited in claim 9, where:

$$\sigma_1^2(b)=E(n_{k-1,t}^2(b))-E^T(n_{k-1,t}(b)\overline{n}(b))\overline{R}^{-1}(b)E(n_{k-1,t}(b)\overline{n}(b));$$

and $$\sigma_2^2(b)=E(n_{k,t}^2(b))-E^T(n_{k,t}(b)\overline{n}(b))\overline{R}^{-1}(b)E(n_{k,t}(b)\overline{n}(b)).$$

12. The data storage device as recited in claim 11, where the control circuitry is further configured to compute a covariance matrix of the form:

$$\Sigma(b) = \begin{bmatrix} \sigma_1^2(b) & E(e_{k-1,t}(b)e_{k,t}(b)) \\ E(e_{k,t}(b)e_{k-1,t}(b)) & \sigma_2^2(b) \end{bmatrix}.$$

13. The data storage device as recited in claim 12, where the control circuitry is further configured to generate a branch metric br of the 2D sequence detector according to:

$$br=-1n(|\Sigma(b)|)-e_t^T\Sigma^{-1}(b)e_t$$

where $e_t=[e_{k-1,t}(b), e_{k,t}(b)]^T$.

14. A method of operating a disk drive, the method comprising:

positioning a first read element over a first data track k−1 and position a second read element over a second data track k;

sampling a first read signal from the first read element to generate first signal samples;

sampling a second read signal from the second read element to generate second signal samples;

performing first 2D equalization of the first signal samples and the second signal samples to generate first 2D equalized samples;

performing second 2D equalization of the first signal samples and the second signal samples to generate second 2D equalized samples;

performing first 2D data dependent noise whitening (DDNW) filtering of the first and second 2D equalized samples to generate first 2D noise whitened samples;

performing second 2D DDNW filtering of the first and second 2D equalized samples to generate second 2D noise whitened samples; and using a 2D sequence detector to detect a first data sequence recorded in the first data track from the first and second 2D noise whitened samples and to detect a second data sequence recorded in the second data track from the first and second 2D noise whitened samples.

15. The method as recited in claim 14, wherein:

the first 2D DDNW filter is configured to minimize a first data dependent noise prediction error $e_{k-1,t}(b)$ based on:

$$e_{k-1,t}(b)=n_{k-1,t}(b)-A_1^T(b)n(b)-m_1(b)$$

the second 2D DDNW filter is configured to minimize a second data dependent noise prediction error $e_{k,t}(b)$ based on:

$$e_{k,t}(b)=n_{k,t}(b)-A_2^T(b)n(b)-m_2(b)$$

where:

t represents a time index;

b represents one of a plurality of data patterns;

n(b) represents a 2D vector of past noise samples in the first and second 2D equalized samples;

$n_{k-1,t}(b)$ represents a noise sample in the first 2D equalized samples;

$A_1(b)$ represents a first data dependent noise prediction filter;

$m_1(b)$ represents a DC component of predicted noise in the first 2D equalized samples;

$n_{k,t}(b)$ represents a noise sample in the second 2D equalized samples;

$A_2(b)$ represents a second data dependent noise prediction filter; and $m_2(b)$ represents a DC component of predicted noise in the second 2D equalized samples.

16. The method as recited in claim 15, where:

$$m_1(b)=[E(n_{k-1,t}(b))-E^T(n_{k-1,t}(b)n(b))R^{-1}(b)E(n(b))][1-E^T(n(b))R^{-1}(b)E(n(b))]^{-1}$$

$$A_1(b)=R^1(b)[E(n_{k-1,t}(b)n(b))-m_1(b)E(n(b))]$$

$$R(b)=E(n(b)n^T(b)).$$

17. The method as recited in claim 16, where:

$$m_2(b)=[E(n_{k,t}(b))-E^T(n_{k,t}(b)n(b))R^{-1}(b)E(n(b))][1-E^T(n(b))R^{-1}(b)E(n(b))]^{-1}$$

$$A_2(b)=R^1(b)[E(n_{k,t}(b)n(b))-m_2(b)E(n(b))]$$

$$R(b)=E(n(b)n^T(b)).$$

18. The method as recited in claim 17, where:

$$\sigma_1^2(b) = E(n_{k-1,t}^2(b)) - E^T(n_{k-1,t}(b)n(b))R^{-1}(b)E(n_{k-1,t}(b)n(b)) - \frac{[E(n_{k-1,t}(b)) - E^T(n_{k-1,t}(b)n(b))R^{-1}(b)E(n(b))]^2}{1 - E^T(n(b))R^{-1}(b)E(n(b))}$$

$$\sigma_2^2(b) = E(n_{k,t}^2(b)) - E^T(n_{k,t}(b)n(b))R^{-1}(b)E(n_{k,t}(b)n(b)) - \frac{[E(n_{k,t}(b)) - E^T(n_{k,t}(b)n(b))R^{-1}(b)E(n(b))]^2}{1 - E^T(n(b))R^{-1}(b)E(n(b))}.$$

19. The method as recited in claim 18, further comprising computing a covariance matrix of the form:

$$\Sigma(b) = \begin{bmatrix} \sigma_1^2(b) & E(e_{k-1,t}(b)e_{k,t}(b)) \\ E(e_{k,t}(b)e_{k-1,t}(b)) & \sigma_2^2(b) \end{bmatrix}.$$

20. The method as recited in claim 18, further comprising generating a branch metric br of the 2D sequence detector according to:

$$br=-1n(|\Sigma(b)|)-e_t^T\Sigma^{-1}(b)e_t$$

where $e_t=[e_{k-1,t}(b), e_{k,t}(b)]^T$.

21. The method as recited in claim 14, wherein:

the first 2D DDNW filtering minimizes a first data dependent noise prediction error $e_{k-1,t}(b)$ based on:

$$e_{k-1,t}(b)=n_{k-1,t}(b)-\overline{A}_1^T(b)\overline{n}(b)-m_1(b)$$

the second 2D DDNW filtering minimizes a second data dependent noise prediction error $e_{k,t}(b)$ based on:

$$e_{k,t}(b)=n_{k,t}(b)-\overline{A}_2^T(b)\overline{n}(b)-m_2(b)$$

where:

t represents a time index;

b represents one of a plurality of data patterns;

$\overline{n}(b)=[n(b), 1]$ n(b) represents a 2D vector of past noise samples in the first and second 2D equalized samples;

$n_{k-1,t}(b)$ represents a noise sample in the first 2D equalized samples;

$\overline{A}_1(b)=[A_1(b), m_1(b)]$;

$A_1(b)$ represents a first data dependent noise prediction filter;

$m_1(b)$ represents a DC component of predicted noise in the first 2D equalized samples;

$n_{k,t}(b)$ represents a noise sample in the second signal samples; and $\overline{A}_2(b) = [A_2(b), m_2(b)]$;

$A_2(b)$ represents a second data dependent noise prediction filter; and $m_2 b$ represents a DC component of predicted noise in the second 2D equalized samples.

22. The method as recited in claim 21, where:

$$\overline{A}_1(b) = \overline{R}^{-1}(b) E(n_{k-1}(b)\overline{n}(b)) R(b) = E(n(b) n^T(b));$$

and $$\overline{R}(b) = E(\overline{n}(b)\overline{n}^T(b)).$$

23. The method as recited in claim 22, where:

$$\overline{A}_2(b) = \overline{R}^{-1}(b) E(n_k(b)\overline{n}(b));$$

and $$\overline{R}(b) = E(\overline{n}(b)\overline{n}^T(b)).$$

24. The method as recited in claim 23, where:

$$\sigma_1^2(b) = E(n_{k-1,t}^2(b)) - E^T(n_{k-1,t}(b)\overline{n}(b)) \overline{R}^{-1}(b) E(n_{k-1,t}(b)\overline{n}(b));$$

and $$\sigma_2^2(b) = E(n_{k,t}^2(b)) - E^T(n_{k,t}(b)\overline{n}(b)) \overline{R}^{-1}(b) E(n_{k,t}(b)\overline{n}(b)).$$

25. The method as recited in claim 24, further comprising computing a covariance matrix of the form:

$$\Sigma(b) = \begin{bmatrix} \sigma_1^2(b) & E(e_{k-1,t}(b) e_{k,t}(b)) \\ E(e_{k,t}(b) e_{k-1,t}(b)) & \sigma_2^2(b) \end{bmatrix}.$$

26. The method as recited in claim 25, further comprising generating a branch metric br of the 2D sequence detector according to:

$$br = -\ln(|\Sigma(b)|) - e_t^T \Sigma^{-1}(b) \, e_t$$

where $e_t = [e_{k-1,t}(b), e_{k,t}(b)]^T$.

* * * * *